Patented Aug. 18, 1936

2,051,133

UNITED STATES PATENT OFFICE 2,051,133

AZODYESTUFFS CONTAINING COPPER IN A COMPLEX FORM

Detlef Delfs, Rudolf Knoche, and Ernst Messmer, Leverkusen-I. G.-Werk, and Heinrich Clingestein, Cologne-on-the-Rhine, Germany, assignors to General Aniline Works, Inc., New York, N. Y., a corporation of Delaware No Drawing. Application August 24, 1933, Serial No. 686,652. In Germany September 15, 1932

8 Claims. (Cl. 260—12)

The present invention relates to azodyestuffs containing copper in a complex form, more particularly it relates to dyestuffs which may be represented by the probable general formula:

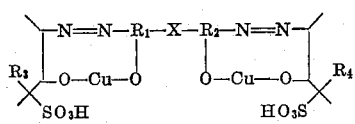

wherein —X— stands for one of the groups —N=N— and

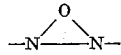

$R_1$ and $R_2$ stand for aromatic radicals of the benzene series to which the azo-bridges are attached in p-position to X and wherein the bridges —O—Cu—O— are attached to $R_1$ and $R_2$ in o-position to the axo-bridges, and wherein $R_3$ and $R_4$ stand for aromatic radicals, such as a radical of the benzene, naphthalene, carbazole series which may bear further substituents, such as the sulfonic acid group, the carboxylic acid group, alkyl, alkoxy, halogen and the nitro group.

Our new dyestuffs are obtainable by various methods, for example, by tetrazotizing a p, p'-diaminomonoazodyestuff of the general formula:

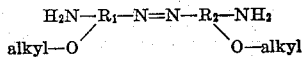

wherein $R_1$ and $R_2$ stand for aromatic radicals of the benzene series, to which the O-alkyl radicals are attached in o-position to the $NH_2$ radicals, coupling with two molecular proportions of the same or different coupling components coupling in o-position to a hydroxy group and coppering the trisazodyestuff thus obtained with the splitting up of the alkoxy group. Or otherwise our new dyestuffs are obtainable by diazotizing an amine of the type:

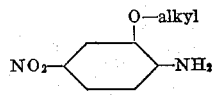

coupling with a coupling component coupling in o-position to a hydroxy group, combining two molecules of the nitromonoazodyestuffs to trisazodyestuffs or disazoazoxydyestuffs by reducing the nitro groups to the azo- or azoxy groups in an alkaline medium according to methods known per se and finally coppering the trisazodyestuffs or disazoazoxydyestuffs with the splitting up of the alkoxy groups.

Further our dyestuffs are obtainable by diazotizing an amino compound of the following type:

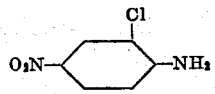

coupling with a coupling component coupling in o-position to a hydroxy group, combining two molecules of the nitromonoazodyestuffs to trisazodyestuffs or disazoazoxydyestuffs by reducing the nitro groups to the azo- or azoxy groups in an alkaline medium according to methods known per se and finally coppering the trisazodyestuffs or disazoazoxydyestuffs with a splitting off of the chlorine atoms in ortho-position to the azo group and formation of the corresponding copper-containing ortho-hydroxy azodyestuffs, said method of coppering being more fully described in German specification 571,859, or finally our dyestuffs are obtainable by diazotizing one of the amines of the following types:

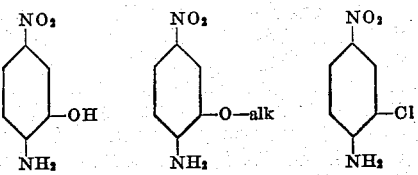

coupling with a coupling component coupling in o-position to a hydroxy group transforming the monoazodyestuffs into copper-containing o-hydroxyazodyestuffs, and combining two molecules of the copper-containing nitro-monoazodyestuffs to trisazodyestuffs or disazoazoxydyestuffs by reducing the nitro groups to the azo- or azoxy groups in an alkaline medium according to methods known per se.

Our new dyestuffs are in form of their alkali metal salts generally dark powders, soluble in water, dyeing the cellulosic fibre generally violet to blue to grey, especially blue, shades of good fastness properties. Those dyestuffs capable of further undergoing coupling may be developed on the fibre by coupling with diazo compounds, while those containing diazotizable amino groups may be developed by diazotizing on the fibre and coupling with coupling components, whereby new shades are obtainable.

The invention is illustrated by the following examples, without being limited thereto:

*Example 1.*—55.3 parts by weight of the sodium salt of the dyestuff from 1 molecular proportion of 4,4'-diamino-5,5'-dimethoxy-2-methyl-1,1'-azobenzene-2'-sulfonic acid and 2 molecular proportions of 1-hydroxynaphthalene-4,8-disulfonic acid are dissolved in 3000 parts by weight of water and after adding 30 parts by weight of crystallized copper sulfate and a mixture of 100 parts by weight of aqueous ammonia of 25% strength and 200 parts by weight of water, the solution is heated for 10 hours at 85° C., while stirring. The dyestuff having in the free state the following formula:

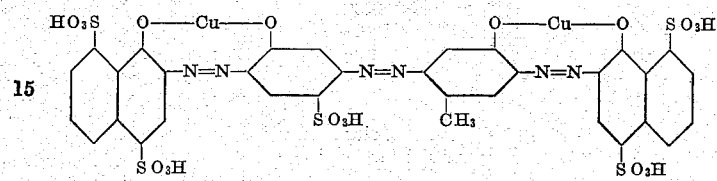

is isolated by salting out, filtered and dried. In its free state it is a dark, bronze lustrous powder, which is soluble in water with a blue coloration. The vegetable fibre is dyed blue shades of good fastness to light.

In an analogous manner there can be coppered other azodyestuffs from one molecular proportion tetrazotized 4,4'-diamino-5,5'-dimethoxy-1,1'-azobenzene or a substitution product thereof and two molecular proportions of the same or different coupling component coupling in ortho-position with respect to a hydroxy group. Thus, the dyestuff from one molecular proportion of tetrazotized 4,4'-diamino-5,5'-dimethoxy-1,1'-azobenzene and two molecular proportions of 2-amino-5-hydroxy-naphthalene-1,7-disulfonic acid yields a copper complex compound, dyeing cellulosic fibres greenish-blue shades of good fastness to light.

*Example 2.*—52.7 parts by weight of the monoazodyestuff from diazotized 5-nitro-2-amino-1-methoxybenzene and the sodium salt of 1-hydroxynaphthalene-3,6-disulfonic acid are dissolved in 3000 parts by weight of water and 90 parts by weight of aqueous caustic soda lye of 38° Bé. strength. At 75-80° C. there is slowly introduced, while stirring, a solution of 12 parts by weight of grape sugar in 100 parts by weight of water. When the reduction is complete, the dyestuff is isolated by salting out and is dried. 100 parts by weight of the dyestuff thus obtained are dissolved in 3500 parts by weight of water and, after the addition of 30 parts by weight of crystallized copper sulfate and a mixture of 90 parts by weight of aqueous ammonia of 25% strength and 200 parts by weight of water, the solution is heated for 8 hours at 80-90° C., while stirring. The dyestuff having in its free state the following formula:

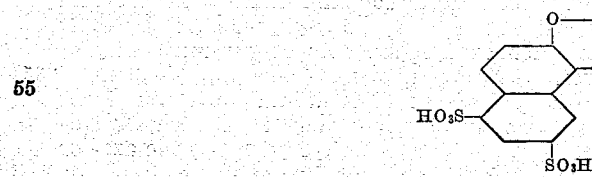

is isolated by salting out. It is obtained after drying in form of a dark powder, soluble in water with a greenish-blue coloration, dyeing the vegetable fibre blue shades of excellent fastness to light.

Dyestuffs having similar properties are obtained when substituting the 1-hydroxynaphthalene-3,6-disulfonic acid by equivalent quantities of 8-chloro-1-hydroxynaphthalene-3,6-disulfonic acid or of 1-hydroxynaphthalene-3,8- or -4,7- or -4,8-disulfonic acid, or by substituting the 5-nitro-2-amino-1-methoxybenzene by equivalent quantities of 5-nitro-4-chloro-2-amino-1-methoxybenzene or 5-nitro-4-methyl-2-amino-1-methoxybenzene or by 5-nitro-2-amino-1,4-dimethoxybenzene.

The temperatures required for performing the reduction with grape sugar somewhat depend upon the specific nitroazodyestuffs subjected to the reduction. As a general rule, however, there may be stated that temperatures between about 60 and about 90° C. are suitable for performing the reduction.

*Example 3.*—52.7 parts by weight of the monoazodyestuff from diazotized 5-nitro-2-amino-1-methoxybenzene and the sodium salt of 2-hydroxynaphthalene-5,7-disulfonic acid are dissolved in 3000 parts by weight of water and 75 parts by weight of aqueous caustic soda lye of 38° Bé. At 65-70° C. there is slowly introduced, while stirring, a solution of 12 parts by weight of grape sugar and 100 parts by weight of water. When the reduction is complete, the dyestuff is salted out, filtered and dried.

100 parts by weight of the dyestuff thus obtained are dissolved in 2500 parts by weight of water and heated to 85° C. To the solution there is added, while stirring, a solution of 33 parts by weight of crystallized copper sulfate and 100 parts by weight of aqueous ammonia of 25% strength in 250 parts by weight of water. The mixture is stirred for about 12 hours at 80-90° C., and the dyestuff having in its free state the following formula:

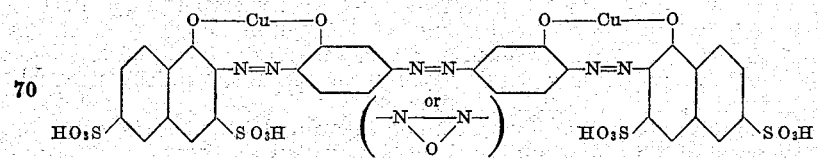

is isolated by salting out. It dyes the vegetable fibre blue shades of good fastness to light and boiling.

Dyestuffs of similar properties are obtained when substituting the 2-hydroxynaphthalene-5,7-disulfonic acid by the 2-hydroxynaphthalene-3,6- (or -3,7-) disulfonic acid.

*Example 4.*—58.3 parts by weight of the monoazodyestuff obtainable by coupling in an alkaline medium diazotized 5-nitro-2-amino-1-methoxybenzene and 2-(3'-carboxyphenyl) amino-8-hydroxynaphthalene-6-sulfonic acid (disodium salt) are suspended in 5000 parts by weight of water and 60 parts by weight of aqueous caustic soda lye of 38° Bé. strength. The mixture is heated to 65-70° C., thereto is slowly introduced a solution of 13 parts by weight of grape sugar in 100 parts by weight of water. When the reduction is complete, after about 2 hours, the dyestuff is isolated by salting out, filtered and dried. 100 parts by weight of the dyestuff thus obtained are dissolved in 5000 parts by weight of water, and after the addition of a solution of 30 parts by weight of crystallized copper sulfate and 90 parts by weight of aqueous ammonia of 25% strength in 250 parts by weight of water, the solution is heated for about 12 hours at 80° C., while stirring. The dyestuff having in its free state the following formula:

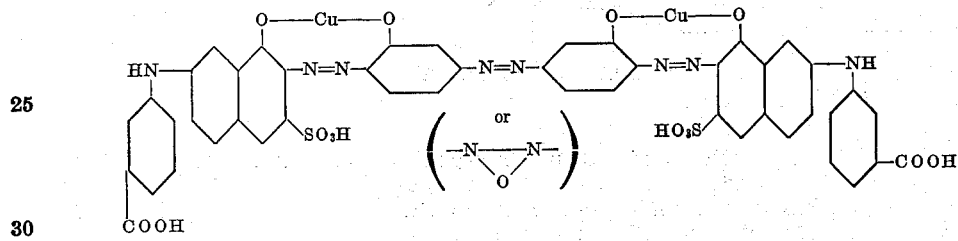

is isolated by salting out after cooling, filtered and dried. It is obtained in form of a dark, bronze lustrous powder which is soluble in water with dull blue coloration; it dyes the vegetable fibre blue-grey shades fast to light and boiling.

Dyestuffs having similar properties are obtained when substituting the 2-(3'-carboxyphenyl)-amino-8-hydroxynaphthalene-6-sulfonic acid by corresponding quantities of 2-(3'-sulfophenyl)-amino-8-hydroxynaphthalene-6-sulfonic acid or 2-(4'-carboxyphenyl)-amino-8-hydroxynaphthalene-6-sulfonic acid or the 2-(3'-carboxyphenyl)-amino-5-hydroxynaphthalene-7-sulfonic acid or the 2-amino-5-hydroxynaphthalene-1,7-disulfonic acid. The dyestuff prepared with the aid of 2-(4'-carboxyphenyl)-amino-8-hydroxynaphthalene-6-sulfonic acid has in the free state the following formula:

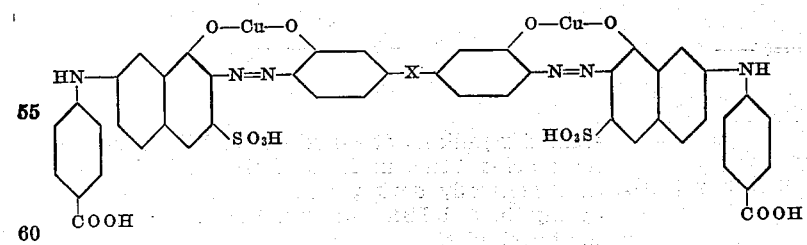

(wherein —X— stands for the groups —N=N— or

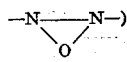

Example 5.—The monoazodyestuff obtainable by coupling diazotized 5-nitro-2-amino-1-methoxybenzene and 1-hydroxycarbazole-3,6-disulfonic acid is reduced with grape sugar in an alkaline medium as described in Examples 2, 3 and 4, and the dyestuff formed is transformed into the copper complex compound as described in the mentioned foregoing examples. The new copper containing azodyestuff having in its free state the following formula:

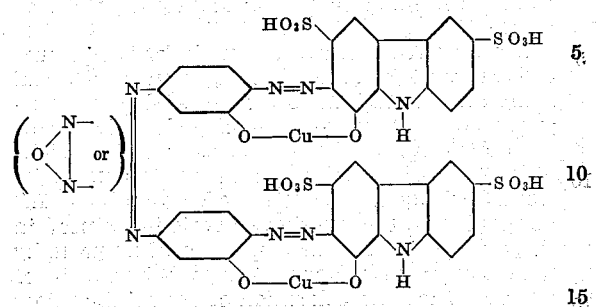

is obtained as a dark powder, soluble in water with a dull bluish-violet coloration, dyeing cotton and regenerated cellulose bluish-black shades.

By substituting the 1-hydroxycarbazole-3,6-disulfonic acid by equivalent quantities of 1,8- or 2,8-dihydroxycarbazole-3,6-disulfonic acid, there are obtained dyestuffs dyeing the vegetable fibre grey shades.

Example 6.—57 parts by weight of the sodium salt of the monoazodyestuff from diazotized 4-nitro-2-chloro-1-aminobenzene and 8-chloro-1-hydroxynaphthalene-3,6-disulfonic acid are dissolved in 5000 parts by weight of water, 60 parts by weight of aqueous caustic soda lye of 38° Bé. are added, and at 65° C. a solution of 15 parts by weight of grape sugar in 150 parts by weight of water is dropped in in the course of 3 hours. The dyestuff formed is isolated by salting out and dried. It is dissolved in 3000 parts by weight of water of 90-95° C., and thereto is added a mixture of 30 parts by weight of crystallized copper sulfate in 200 parts by weight of water, 30 parts by weight of glycerine and 100 parts by weight of aqueous caustic soda lye of 38° Bé. strength. After 8 hours' stirring at 90-95° C., the dyestuff having in its free state the following formula:

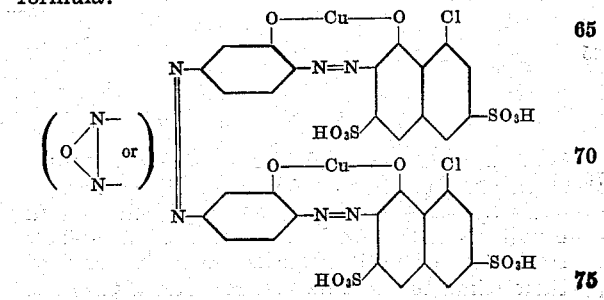

is isolated by salting out. After drying and filtering it is obtained as a dark powder, soluble in water with a blue coloration and dyeing the vegetable fibre greenish-blue shades.

Example 7.—59 parts by weight of the sodium salt of the copper containing monoazodyestuff from diazotized 5-nitro-2-amino-1-hydroxybenzene and 1,8-dihydroxynaphthalene-3,6-disulfonic acid are dissolved in 3000 parts by weight of water, and thereto are added 100 parts by weight of aqueous caustic soda lye of 38° Bé. strength. To the solution there is introduced in the course of one hour a solution of 20 parts by weight of grape sugar and 200 parts by weight of water. When the coloration of the solution does no longer turn to blue, it is acidified with acetic acid, and the dyestuff having in the free state the following formula:

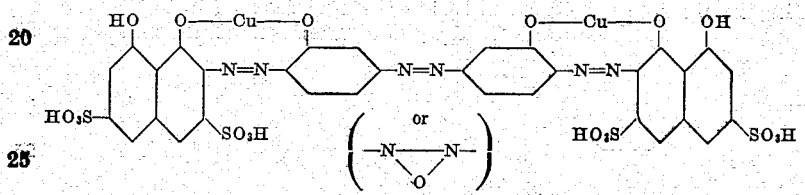

is isolated by salting out. It dyes cotton and regenerated cellulose greenish-blue shades.

By substituting the 1,8-dihydroxynaphthalene-3,6-disulfonic acid by equivalent quantities of other coupling components coupling in ortho position to the hydroxy group, such as 1-amino-8-hydroxynaphthalene and the N-substitution products thereof, 2-amino-5-hydroxynaphthalene-1,7-disulfonic acids, 3-amino-1-hydroxybenzene-4-sulfonic acid, and working otherwise according to the directions given in paragraph 1 of this example, there are obtained dyestuffs having similar properties.

Those dyestuffs containing diazotizable amino groups can be diazotized on the fibre and developed with coupling components to new shades. The above described dyestuff containing as coupling component 1-amino-8-hydroxynaphthalene-3,6-disulfonic acid yields, when diazotized on the fibre and coupled with 1,3-diaminobenzene or 2-hydroxynaphthalene, grey or bluish-black shades respectively.

We claim:

1. Copper-containing azodyestuffs of the general formula:

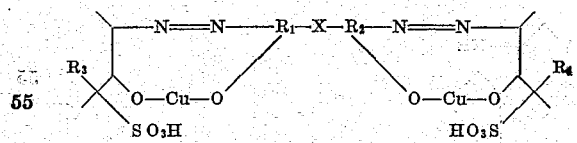

wherein —X— stands for one of the groups —N=N— and

$R_1$ and $R_2$ stand for aromatic radicals of the benzene series to which the azo-bridges are attached in p-position to X and wherein the bridges —O—Cu—O— are attached to $R_1$ and $R_2$ in o-position to the azo-bridges, wherein $R_3$ and $R_4$ stand for aromatic radicals, being in form of their alkali metal salts generally dark powders, soluble in water, dyeing the cellulosic fibre generally violet to blue to grey shades.

2. Copper-containing azodyestuffs of the general formula:

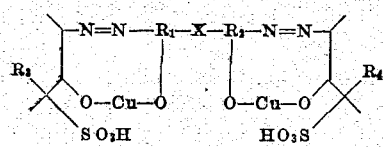

wherein —X— stands for one of the groups —N=N— and

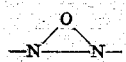

$R_1$ and $R_2$ stand for aromatic radicals of the benzene series to which the azo-bridges are attached in p-position to X and wherein the bridges —O—Cu—O— are attached to $R_1$ and $R_2$ in o-position to the azo-bridges, and wherein $R_3$ and $R_4$ stand for radicals of the naphthalene series, being in form of their alkali metal salts generally dark powders, soluble in water, dyeing the cellulosic fibre generally violet to blue to grey shades.

3. Copper-containing azodyestuffs of the general formula:

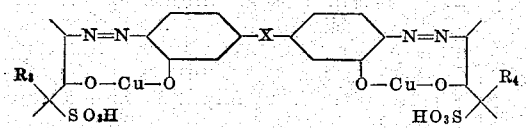

wherein X stands for one of the groups —N=N— and

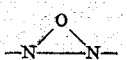

and wherein

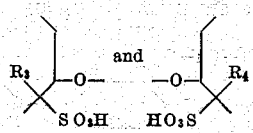

stand for radicals of α-hydroxynaphthalene-sulfonic acids, being in form of their alkali metal salts generally dark powders, soluble in water, dyeing the cellulosic fibre generally violet to blue to grey shades.

4. The dyestuff having in the free state the following formula:

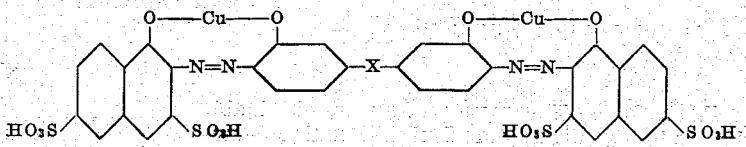

(wherein X stands for one of the groups —N=N— and

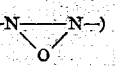

being in form of its alkali metal salt a dark powder, soluble in water and dyeing the vegetable fibre blue shades of excellent fastness to light.

5. Copper-containing azodyestuffs of the general formula:

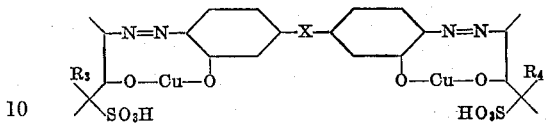

wherein X stands for one of the groups —N=N— and

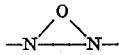

and wherein

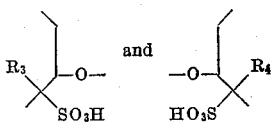

stand for radicals of aminonaphtholsulfonic acids, being in form of their alkali metal salts generally dark powders, soluble in water, dyeing the cellulosic fibre generally violet to blue to grey shades.

6. The dyestuff having in the free state the following formula:

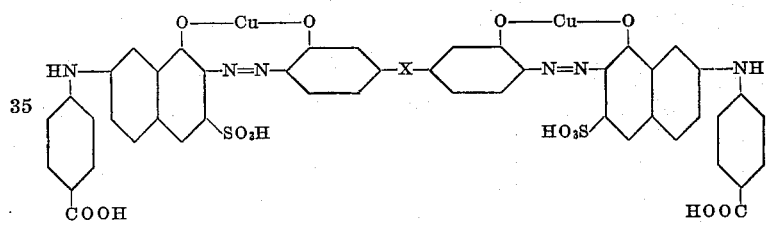

(wherein X stands for one of the groups —N=N— and

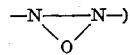

being in form of its alkali metal salt a dark, bronze lustrous powder which is soluble in water with a dull blue coloration, and dyeing the vegetable fibre blue-grey shades fast to light and boiling.

7. Copper-containing azodyestuffs of the general formula:

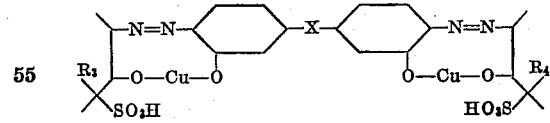

wherein X stands for one of the groups —N=N— and

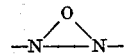

and wherein

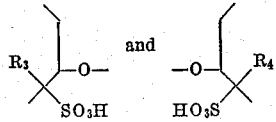

stand for radicals of hydroxycarbazole sulfonic acids, being in form of their alkali metal salts generally dark powders, soluble in water and dyeing the cellulosic fibre generally violet to blue to grey shades.

8. The dyestuff having in the free state the following formula:

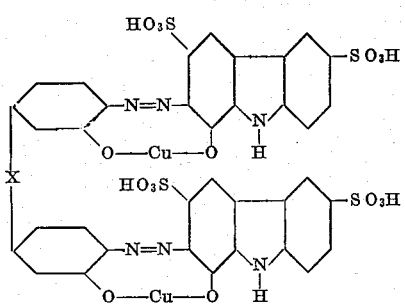

(wherein X stands for one of the groups —N=N— and

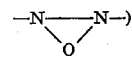

being in form of its alkali metal salt a dark powder, soluble in water with a dull bluish-violet coloration and dyeing cotton and regenerated cellulose bluish-black shades.

DETLEF DELFS.
RUDOLF KNOCHE.
ERNST MESSMER.
HEINRICH CLINGESTEIN.